United States Patent [19]
Oelke et al.

[11] 4,047,919
[45] Sept. 13, 1977

[54] APPARATUS FOR PRESS BENDING RELATIVELY THIN GLASS SHEETS

[75] Inventors: Waldemar W. Oelke, Rossford; Floyd T. Hagedorn, Oregon, both of Ohio

[73] Assignee: Libbey-Owens-Ford Company, Toledo, Ohio

[21] Appl. No.: 589,020

[22] Filed: June 23, 1975

[51] Int. Cl.² .......................................... C03B 23/02
[52] U.S. Cl. ...................................... 65/273; 65/275; 65/350
[58] Field of Search ................ 65/104, 106, 273, 275, 65/348, 349, 350, 351

[56] References Cited
U.S. PATENT DOCUMENTS

| | | | |
|---|---|---|---|
| 3,333,934 | 8/1967 | Seymour | 65/104 X |
| 3,421,875 | 1/1969 | Kirkman | 65/104 X |
| 3,607,200 | 12/1967 | McMaster | 65/275 X |
| 3,881,906 | 5/1975 | Ritter, Jr. et al. | 65/106 X |

Primary Examiner—Arthur D. Kellogg
Attorney, Agent, or Firm—Collins, Oberlin & Darr

[57] ABSTRACT

A method of and apparatus for bending and tempering a relatively thin glass sheet comprising heating the glass sheet to its softening point, advancing the sheet toward and between a pair of opposed press members, reheating the sheet during movement thereof between said press members, bending the sheet into the desired curvature between the press members and finally, chilling the sheet rapidly below the annealing temperature range of the glass.

6 Claims, 5 Drawing Figures

APPARATUS FOR PRESS BENDING RELATIVELY THIN GLASS SHEETS

BACKGROUND OF THE INVENTION

The present invention relates generally to the production of curved, tempered sheets of glass and, more particularly, to an improved method of and apparatus for bending and heat treating relatively thin glass sheets.

Bent sheets of glass are commonly used as glazing closures in vehicles such as automobiles and the like. For such applications, the glass sheets must be bent to precisely defined curvatures dictated by the configurations and size of the openings and the overall styling of the vehicle. Additionally, it is necessary that bent glass sheets utilized as glazing closures in vehicles be tempered to increase their resistance to damage resulting from impact and, in the event of breakage, to fragment into relatively small harmless particles as opposed to the large, jagged, potentially dangerous pieces otherwise resulting from untempered glass sheets when broken. Further, it is important that the bent and tempered glass sheets meet stringent optical requirements and that the viewing area of glazing closures be free of surface defects and optical distortions that would interfere with clear vision therethrough.

Generally, the commercial production of curved, tempered sheets of glass for such purposes includes heating pretrimmed, flat sheets of glass to the softening temperatures thereof, bending the heated sheets to a desired curvature between a pair of complementary mold sections and then chilling the bent sheets in a controlled manner to a temperature below the annealing range of glass. In a mass production operation, the above operations are carried out successively while the sheets of glass are being advanced substantially continuously along a fixed path to a heating area, a bending area, and a chilling or tempering area. To achieve satisfactory temper, the temperature of the glass sheet must be above a predetermined minimum level so as to maintain the core or central portion thereof above a deformation temperature upon being exposed to the tempering medium. The residual heat remaining in glass sheets of conventional thicknesses, such as those having thicknesses ranging from 0.200 to 0.255 inch, for example, is generally above such predetermined minimum level after bending for immediate advancement to the tempering area and exposure to the tempering medium. Thus, the heat initially imparted to the sheet to bring it to the proper bending temperature can also be utilized in the final heat treating tempering operation.

In recent years, however, considerable emphasis has been placed on the use of thinner glass sheets for automotive glazing purposes, the thicknesses thereof preferably ranging from about 0.100 to 0.156 inch for example. While the process described above is admirably suited for the mass production of the thicker glass sheets, it does not lend itself to the processing of relatively thinner glass sheets because of the lesser ability of such thinner sheets to retain heat. As the thickness of the glass decreases, the rate of heat loss increases. Thus, the heat loss occurring between initial heating and tempering occasioned by the intermediate bending operation in accordance with the above technique brings the temperature of a thin glass sheet down to a level below the aforementioned minimum temperature at which satisfactory tempering can be effected. On the other hand, overheating the thin sheets of glass during initial heating to compensate for the rapid subsequent loss of heat during bending renders the sheets extremely pliable with attendant loss of the deformation control necessary to maintain the shape of the bent sheets within the close tolerances dictated by automobile design and styling requirements. Moreover, such overheating tends to degrade the surface quality of the finished glass as a result of heat stains, roll deformation, pitting and the like. While attempts have been made to solve these problems in the mass production of thin, bent, tempered glass sheets, none have been completely satisfactory in obtaining a quality temper while maintaining the desired shape imparted to such thin glass sheets during bending.

SUMMARY OF THE INVENTION

Accordingly, it is a primary object of the present invention to obviate the above disadvantages by providing a new and improved method of and apparatus for bending and tempering relatively thin sheets of glass.

It is another object of this invention to reheat at least portions of a thin sheet of glass while advancing the same between opposed shaping surfaces immediately prior to the initiation of the press bending cycle.

It is still another object of the present invention to provide an improved press bending apparatus incorporating means for selectively heating portions of the glass sheets prior to bending.

It is a further object of this invention to provide an improved method of and apparatus for supporting and conveying bent glass sheets in a manner preserving the shape imparted thereto during bending.

The foregoing and other objects, advantages, and characterizing features of the present invention will become clearly apparent from the ensuing detailed description of an illustrative embodiment thereof, taken together with the accompanying drawings wherein like reference numerals denote like parts throughout the various views.

DESCRIPTION OF THE PREFERRED EMBODIMENT

Figure 1:
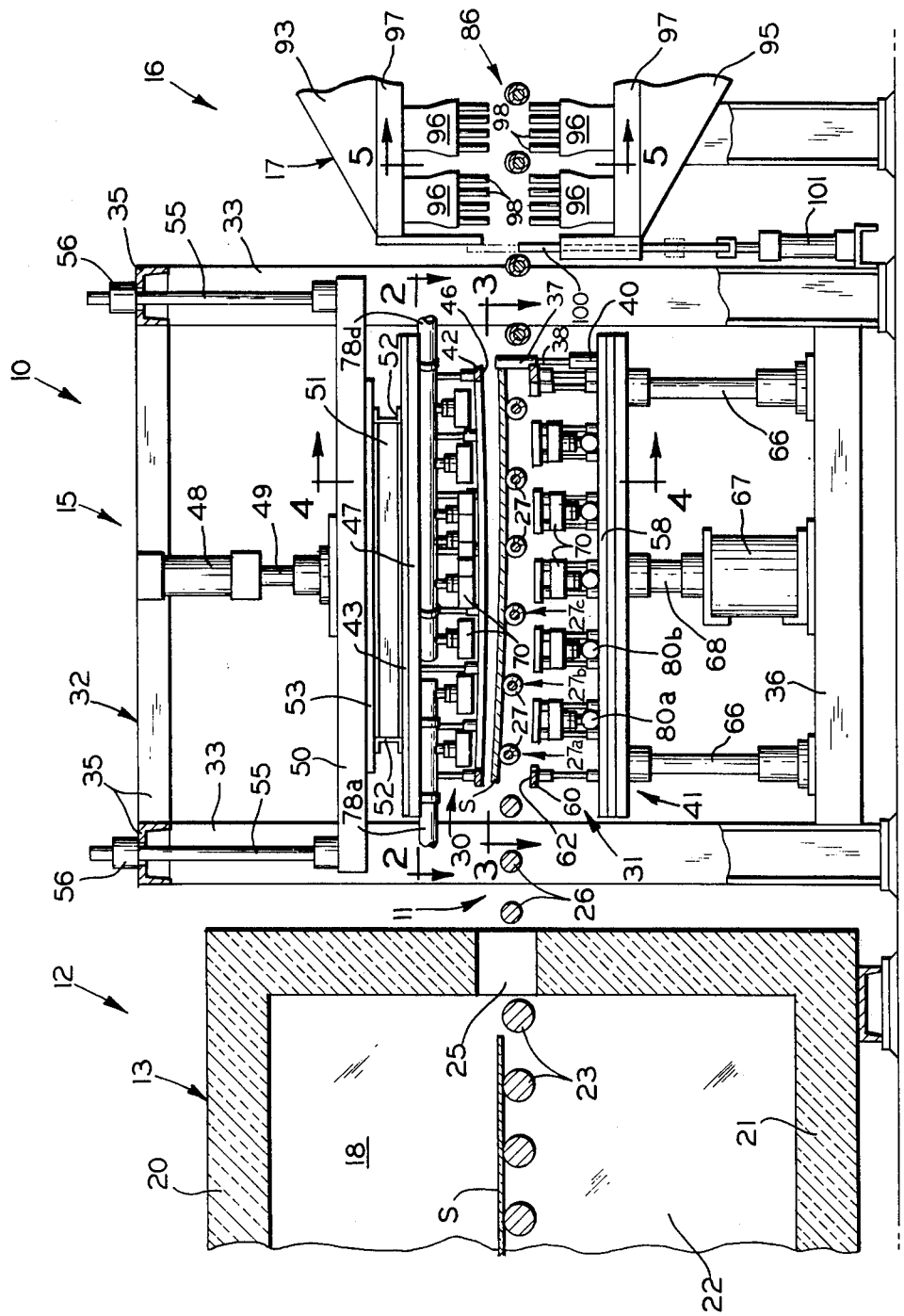
FIG. 1 is a side elevational view of a bending and tempering apparatus constructed in accordance with this invention, with parts of the heating and tempering sections broken away.

Referring now in detail to the illustrative embodiment depicted in the accompanying drawings, there is shown in FIG. 1 a glass sheet bending and tempering apparatus comprehensively designated 10, which includes a continuous conveyor system 11 adapted to support a plurality of sheets S in a generally horizontal plane for movement along a continuous, substantially horizontal path through a heating section 12 having a furnace 13 for heating the sheets to their softening point or bending temperature, a bending station 15 having means for bending the heated sheets S to the desired curvature, and a tempering section 16 having chilling means 17 for rapidly reducing the temperature of the bent sheets to produce the desired temper therein. It should be appreciated that the sheets are positioned on the conveyor system 11 in a manner orienting their respective long dimensions in the direction of travel i.e., normal to the axes of the conveyor rolls forming the system 11. Such an orientation positions the sheet, when subsequently bent to a complex shape, in the most favorable position for proper tempering as will hereinafter be more fully explained.

In the illustrated embodiment, the glass sheets are heated in the furnace 13 which is of the tunnel-type having side walls 18, a top wall 20 and a bottom wall 21 defining a heating chamber 22. The heating chamber 22 can be heated in any desired manner by suitable heating means, such as gas burners or electrical resistance elements for example (not shown), located at the top and side walls of the furnace 13. Such heating means are suitably controlled by apparatus (also not shown) to obtain the desired temperature at various points in the heating chamber 22. The sheets S are carried through the heating chamber 22 of the furnace on a plurality of conveyor rolls 23, forming part of the conveyor system 11, and extending transversely across the chamber 22 with their opposite ends projecting through the opposite side walls 18 and suitably journalled in bearing blocks (not shown) located exteriorly of and along the side walls 18 of the furnace.

A plurality of glass sheets are individually loaded on and supported in a generally horizontal plane on the longitudinally spaced conveyor rolls 23 at the entrance end of the furnace (not shown) and heated substantially uniformly in a controlled manner to the desired bending temperature during their passage therethrough. Upon emerging through an opening 25 at the exit end of the furnace 13, the heated glass sheets S are transferred from conveyor rolls 23 onto a second series of spaced conveyor rolls 26, also part of the conveying system 11 and which are interposed between the heating and bending stations. The sheets S are then transferred to a third series of spaced conveyor rolls 27, which support the glass sheets S horizontally for movement into and within the bending station 15 between a pair of complementary bending press members, hereinafter described, before and after bending, and then convey them to the tempering station 16.

In accordance with this invention, the bending means comprises an upper male press member 30 and a lower female press member 31 having opposed complemental shaping surfaces conforming to the desired curvature of the sheet to be bent. The press members 30 and 31 are mounted for relative movement toward and away from each other on a structural frame 32, which includes a framework of vertically disposed columns 33 and horizontally extending beams 35 interconnected and tied together to form a rigid, box-like structure. A base member 36 extends between the upright columns 33 for supporting the female press member 31 and associated parts. The male press member 30 is mounted above conveyor rolls 27 for vertical reciprocal movement relative to frame 32 while the female press member 31 is located below the conveyor rolls 27 and mounted for vertical reciprocal movement toward and away from the male press member 30.

A pair of laterally spaced locator stops 37 are positioned in the path of movement of the advancing glass sheets to interrupt movement thereof and accurately position the same in the desired location relative to the press members 30 and 31. Each stop 37 is secured to the distal end of a piston rod 38 of a fluid actuating cylinder 40 mounted on a carriage 41. The cylinders 40 are operative to raise and lower the stops 37 between an upper position above conveyor rolls 27 in the path of movement of the glass sheets S and a lower position thereberneath.

Figure 2:
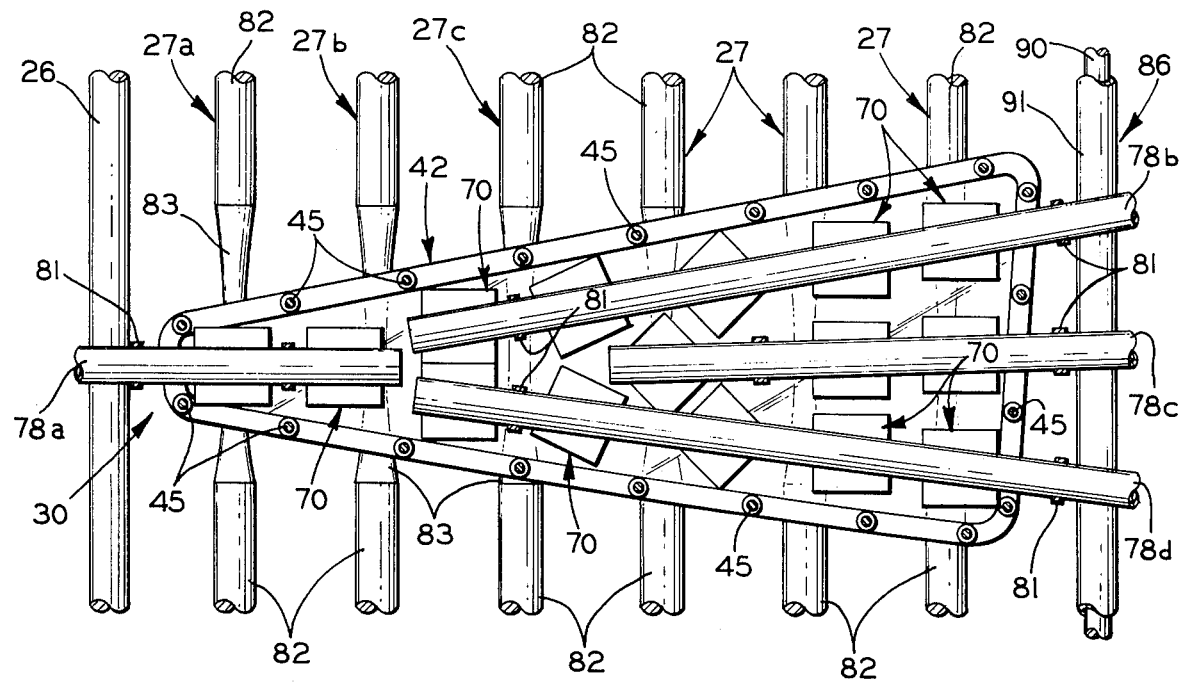
FIG. 2 is a plan view, partly in section, on an enlarged scale, taken along line 2—2 of FIG. 1.
Figure 4:
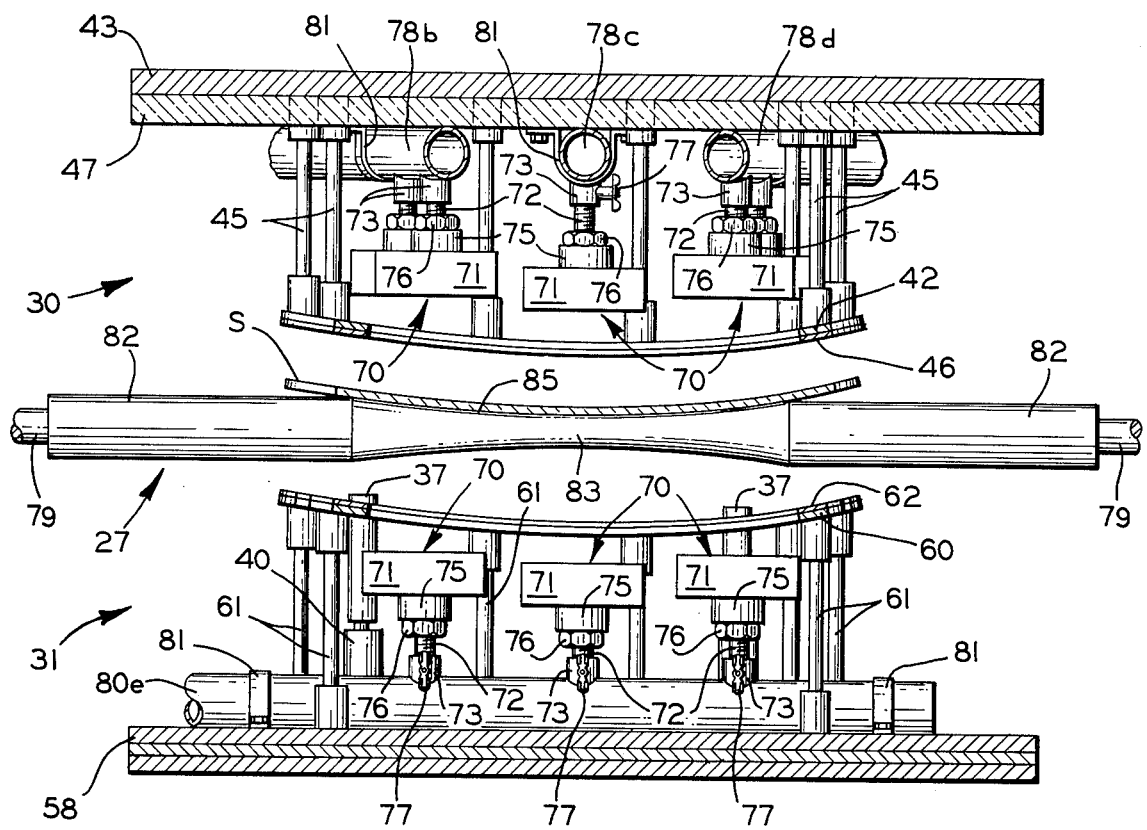
FIG. 4 is a vertical sectional view, on an enlarged scale, taken along line 4—4 of FIG. 1.

As best shown in FIGS. 2 and 4, the male press member 30 is of outline or ring-type construction and comprises a continuous shaping rail 42 connected to a base plate 43 by a plurality of connecting rod members 45. The shaping rail 42 conforms in outline to the glass sheets S to be bent and is provided with a downwardly directed, generally convex shaping surface 46 on the lower surface thereof to impart the desired curvature to the sheet. However, the particular outline of the shaping rail 42, as well as the specific curvature of the shaping surface 46, is dictated by the desired shape of the glass sheet being bent and can vary widely, as desired.

A protective covering 47, formed of a suitable refractory material, is rigidly secured to the lower face of base plate 43 to protect the latter from the severe temperatures generated in the press area, as will hereinafter be explained.

The means for supporting the male press member 30 on frame 32 includes a pair of actuating cylinders 48 (only one of which is shown in FIG. 1) mounted on the upper horizontal beams 35 and having suitable reciprocable pistons (not shown) provided with piston rods 49 connected at their outer ends to a vertically reciprocal platen frame 50. The base member 43 of the male press member 30 is connected to the platen frame 50 for movement therewith by means of interconnected structural members 51 and 52 and a support plate 53 extending transversely of the platen frame 50. A plurality of guide posts 55 are connected at their lower ends to the four corners of platen frame 50, respectively, and extend upwardly through suitable bushings 56 mounted on upper horizontal beams 35 for sliding movement relative thereto to properly guide platen frame 50 during its vertical reciprocal movement.

Figure 3:
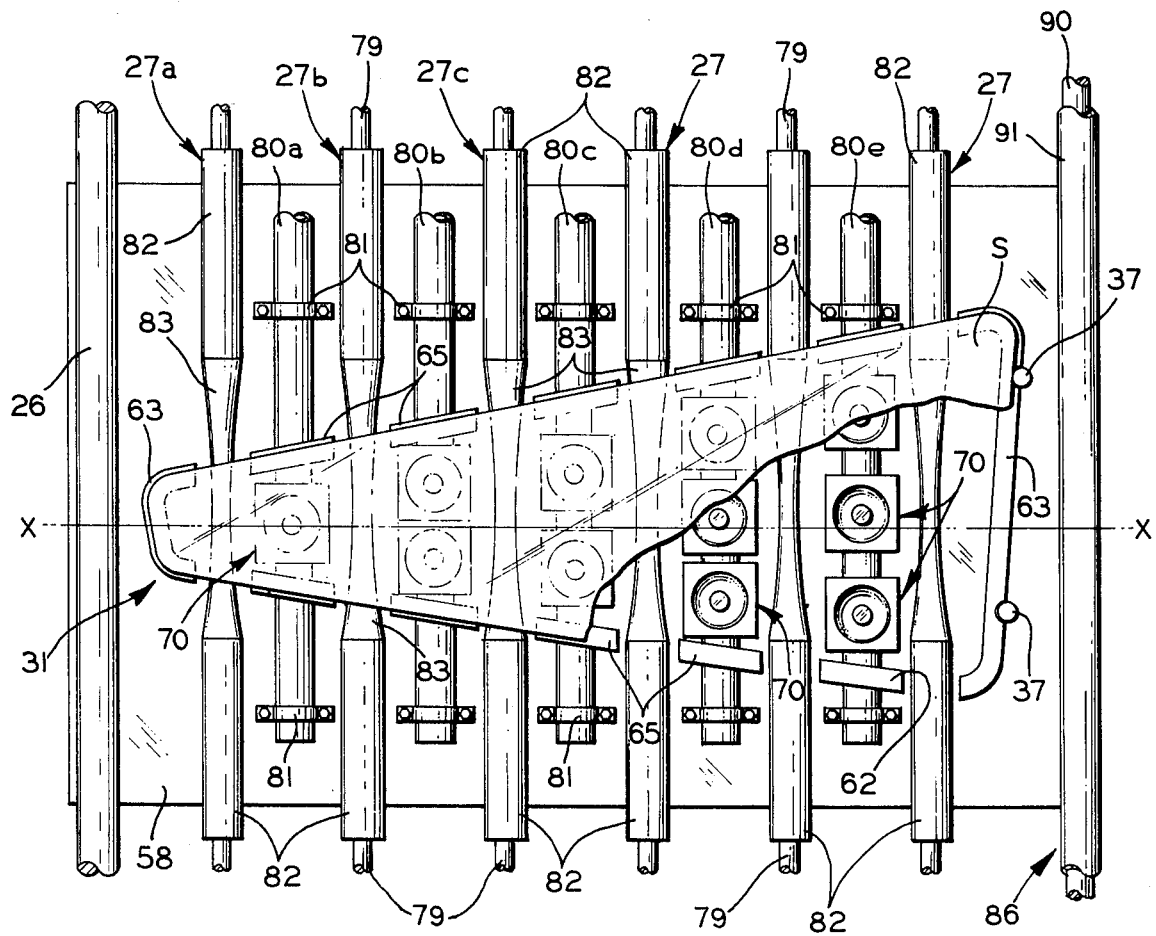
FIG. 3 is a plan view, on an enlarged scale, taken along the line 3—3 of FIG. 1.

As shown in FIGS. 3 and 4, the female press member 31 is also of outline or ring-type construction and comprises a base plate 58 secured to the carriage 41 and a shaping rail 60 connected to the base plate 58 in spaced relation thereto via a series of connecting rods 61. The shaping rail 60 conforms in outline to the glass sheets S to be bent and is provided on its upper face with a generally concave shaping surface 62 complementary to the male press member shaping surface 46 in opposed relation thereto. To permit displacement of the female shaping rail 60 above the level of the conveyor rolls 27 for lifting the glass sheets thereabove into pressing engagement with the male shaping rail 42, the female rail 60 is formed of a plurality of segments (FIGS. 1 and 3) including end bars 63 extending substantially in the same direction as the conveyor roll axes and side bars 65 extending generally transversely of the conveyor rolls 27 and spaced apart from each other a sufficient distance to pass between adjacent rolls 27 when raised and lowered.

The carriage 41 is supported by a pair of guide members 66 (FIG. 1) and vertically movable by a fluid actuator 67 mounted on base member 36 and having a suitable piston rod 68 for raising and lowering the female press member 31 between its lower position beneath conveyor rolls 27 and its upper position thereabove for lifting a heated glass sheet S from the conveyor rolls 27 and pressing the same against the male press member 30 between the complemental shaping surfaces 46 and 62, thus forming the glass sheet into the desired curvature. After bending, piston rod 68 is retracted to lower the female press member 31 below conveyor rolls 27, depositing the bent sheet thereon for advancement into the tempering section.

It has been found that in order to obtain a proper temper in the glass sheet possessing the requisite strain to meet particle size requirements when broken, the temperature thereof when exposed to the chilling medium must be above a minimum level, approximately 1100° F. for example, to maintain the glass core at or above the deformation temperature. When interposing a press bending operation between the glass heating station and the tempering station as is conventionally done in a continuous, mass production bending and tempering operation, some heat loss will occur during the bending cycle as a result of the cooler ambient temperature of the bending area and the relatively cool bending equipment engaging the sheet. In the fabrication of glass sheets of conventional thicknesses, say 0.200 inch and above, it has been found that initially heating the sheets to approximately 1130°-1165° F. will compensate for the heat losses occasioned by bending while maintaining the temperature above said minimum level for quality tempering. Thus, the heat initially imparted to the sheets to bring them to the proper bending temperature can also be utilized in the final heat treating or tempering operation.

However, the above procedure does not lend itself to the fabrication of relatively thin glass sheets, such as those having thicknesses ranging from 0.100 to 0.156 inch for example, because the rate of heat loss increases sharply as the thickness of the glass decreases. The heat initially imparted to the thin sheet would be rapidly dissipated during the time interval between initial heating and tempering to lower the temperature thereof below the level at which tempering would be satisfactorily effected. Moreover, this rapid rate of heat loss cannot be overcome by initially overheating the thin sheet because such overheating creates heat stains, severe roll distortion, pitting and the like, tending to degrade the surface quality of the thin sheet and thereby adversely affect the optical characteristics of the finished product.

A significant feature of the present invention is the resolution of the above problem by providing means in the press members for reheating or applying supplemental heat to at least selective portions of the thin sheet after initial heating and immediately prior to the bending thereof. This expedient makes up any heat loss occurring during conveyance of the thin sheet from the furnace to the press area and maintains the sheet, immediately prior to pressing, at an adequate temperature, without overheating, to compensate for heat losses occurring during the bending cycle and thereby assure a proper glass temperature for quality tempering. To this end, a plurality of heating elements in the form of gas-fired radiant burners, generally designated 70, are mounted on the press members 30 and 31. The burners 70 are substantially identical and each comprises a head 71 having a dish-shaped internal wall and a conduit 72 threaded at one end into a socket 73 formed on its associated manifold and at the other end into the neck portion 75 of head 71. The threaded connection between the burner head 71 and conduit 72 affords axial adjustment of the burner to vary the length thereof for spacing head 71 at an optimum distance from the sheet S to be bent. A lock nut 76 is threaded onto conduit 72 in bearing engagement against neck portion 75 to secure the burner head 71 in the selective adjusted position.

The burners 70 are remotely controlled by an electrical control system (not shown) for controlling the pressure of the gas flowing therethrough between a low pressure or "pilot" setting and a high pressure setting for a purpose hereinafter explained. Each conduit 72 is provided with a control valve 77 to individually vary the pressure setting thereof between the aforementioned low and high pressure settings and consequently the amount of gas admitted to its associated burner and the intensity of the heat generated thereby.

As best shown in FIG. 2, the burners 70 of the male press member 30 are connected to manifolds, identified by reference numerals 78a to 78d, in turn connected to a suitable source of combustible gas under pressure (not shown). The burners 70 of the lower press member 31 (FIG. 3) are connected to a series of manifolds 80a through 80e, also connected to a suitable source of combustible gas under pressure. These latter burners are arranged in rows extending generally parallel to the conveyor rolls 27, the rows being laterally spaced apart to provide clearance for the rolls 27 upon vertical movement of the lower press member 31. Both sets of manifolds are supported against their respective base plates by suitable clamps 81. It should be appreciated that any suitable heating elements capable of generating and directing heat against the opposite glass surfaces can be used in lieu of those shown and described, if desired.

The conveyor rolls 27 in bending station 15 support the glass sheets S before and after bending and are specially configured, as will hereinafter become apparent, to preserve the shape imparted to the glass sheets during bending. The conveyor rolls 27 extend transversely of the path of movement of the sheets S in a laterally spaced relation and are mounted on rotatable shafts 79 journalled for rotation adjacent their respective opposite ends in suitable bearings (not shown). Suitable drive means (not shown) connected to a suitable source of power is provided for rotating the shafts 79 and thereby conveyor rolls 27 in unison. Since such drive means are well known and, per se, form no part of the present invention, it is believed that no further description or amplification thereof is necessary.

The conveyor rolls 27 receive the sheets after bending and, as best shown in FIG. 4, preferably are shaped to fit the finished transverse curvature of the bent sheets. Each conveyor roll 27 is formed of a suitable material and is provided with a pair of cylindrical end portions 82 and a central portion 83 having a progressively diminishing cross section from the end portions 82 inwardly toward the center thereof to provide curved, generally convex supporting surfaces 85 in front elevation complementary to the curvature of the heat-softened bent glass sheets. These curved surfaces 85 offer support for the bent sheets while preserving the shape thereof by preventing the sagging of the sheets out of their desired shape during conveyance out of the bending area. The rolls 27 can be covered with fiber glass, if desired, to protect the surfaces of the bent sheets.

It should be appreciated that the illustrative glass part shown in the drawings and fabricated in accordance with the present invention is one of the most difficult to form because of the complexity of its shape wherein it is bent about two intersecting axes. In addition, the transverse curvature imparted to the sheet is effected about a line, hereinafter referred to as a "chord line" indicated by x—x in FIG. 3, which is offset from the true longitudinal axis of the sheet. This chord line x—x defines a greater mass of glass on one side (upper side as viewed in FIG. 3) than the other side. When conveyed on conventional contoured rolls wherein the entire bottom surface of the glass engages in its entirety the complemental contoured surfaces of the rolls, the leading edge of the sheet tends to veer or "walk" laterally in the direction of the greater mass while being conveyed longitudinally. Such lateral walking of the glass relative to the roll contoured surfaces causes the chord line of the heat-softened glass to shift laterally out of its desired orientation relative to the longitudinal axis of the sheet and thereby alter the overall shape of the sheet beyond acceptable tolerances.

In order to overcome this problem, the length of the curved supporting surface 85 of each roll 27 is designed to be slightly shorter than the transverse dimension of the curved sheet at its widest dimension as shown in FIG. 4. This precludes engagement of the entire bottom surface of the sheet with such curved supporting surface 85. By avoiding frictional engagement of the lateral side portions adjacent the wider leading edge of the sheet with surfaces 85, which leading edge tends to steer or guide the advancing sheet, such "walking" is eliminated and a true longitudinal path of movement along the chord line is assured.

In addition to the transverse curvature, the complementary mold members 30 and 31 are shaped (FIG. 1) to impart a lengthwise curvature to the sheet S, particularly adjacent the trailing end thereof to form a swept-up tail end portion. To prevent sagging of the heat-softened bent sheet out of its desired curvature in the longitudinal direction, and especially along the narrow trailing end thereof which is particularly pliable because of its small mass, the first few rolls identified as 27a, 27b and 27c adjacent the entrance end of the bending station are disposed at varying vertical levels different from the remainder of the rolls 27. Rolls 27a-27c are positioned at progressively lower levels to conjointly define a curved surface complementary to the curvature imparted to the corresponding tail end of the sheet S. Of course, the relative vertical disposition of all the rolls can vary in conformity with the overall longitudinal shape imparted to the sheet S.

After the sheets have been bent to their desired curvatures in station 15 and returned to conveyor rolls 27, they are moved out of the bending station and are received on a series of fourth conveyor rolls 86, also a part of the conveyor system 11, located downstream of female press member 31. The series of conveyor rolls 86 receive the bent glass sheets from conveyor rolls 27 and advance them to and through the tempering station 16.

Figure 5:
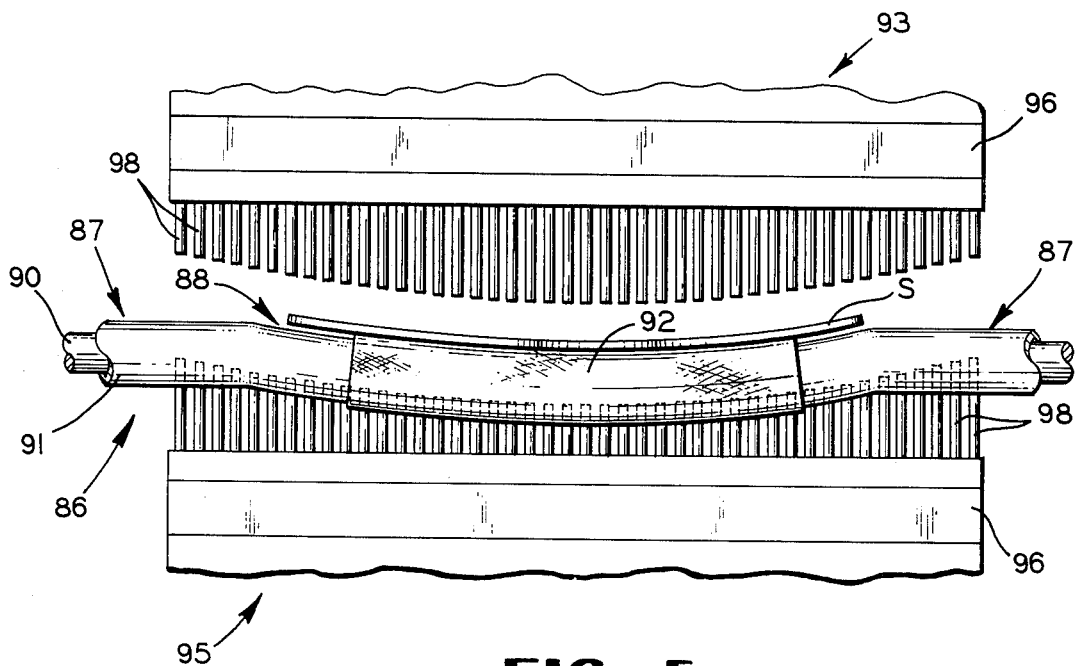
FIG. 5 is a vertical sectional view, on an enlarged scale, taken along line 5—5 of FIG. 1.

Conveyor rolls 86 are designed to adequately support the heat-softened bent sheets in a manner maintaining their shapes while permitting the maximum exposure of air thereto for rapid chilling. To this end, each conveyor roll 86 comprises straight opposite end portions 87 (FIG. 5) having a common axis and a central, arcuately curved portion 88 contoured to fit the finished curvature of the bent sheets. Each roll 86 comprises an inner, flexible, stationary core member 90 and an outer flexible, load carrying, rotatable sleeve 91 surrounding the core member 90. While the outer sleeve 91 is flexible for conforming to the curved shape of the inner core member 90, it is capable of transmitting torque without significant axial twist or distortion. Suitable means are provided for rotating the sleeves 91 in unison about core member 90 and their respective chordal axes. Since such drive means can be conventional and, per se, form no part of this invention, it is believed that a detailed description and illustration thereof is not necessary.

Since the bent sheet S is still in a heat-softened condition at a temperature adequate for proper tempering, above 1100° F. for example, it is important to preserve the shape thereof during tempering. When using conventional rolls having standard dimensioned curved portions, such as that depicted in FIG. 5, a sleeve 92 can be provided on the central curved portion 88 of each roll 86 to assure advancement of the bent sheet in a true linear path along its chord line. The length of sleeve 92 is made shorter than the width of the sheet at its widest dimension to preclude engagement of the opposite sides of the sheet with the curved supporting surface of the roll and thereby avoid "walking" as described above. Of course, specially configured rolls identical to the rolls 27 employed in the press area can be used in lieu of the sleeved conveyor rolls 86, if desired.

The chilling means 17 in tempering station 16 comprise upper and lower blastheads 93 and 95 disposed above and below the path of movement of the glass sheets and are operable to direct opposed blasts of cooling fluid, such as air for example, toward and against the opposite surfaces of the sheets moving along such path. Each of the blastheads 93 and 95 comprises a plurality of elongated manifolds 96 suitably secured to and communicating with a plenum chamber 97. A plurality of tubes 98 project from the manifolds 96 inwardly toward the path of movement of the sheet S to direct a plurality of streams of cooling gases from a pressure supply source via plenum chambers 97 and manifolds 96 toward the opposite surfaces of the hot glass sheet.

It has been found that the spacing of the tube outlets from the opposite surfaces of a hot, thin glass sheet is an important consideration in air quenching in producing sufficient quantities of cooling gases at the opposite surfaces of the thin sheets at pressures which will not adversely affect the finished product. By appropriate design, the optimum spacing for a particular tube size can be readily determined. Of course, this optimum spacing should extend throughout the entire surface areas of the sheet. To this end, the tubes 98 of the illustrative embodiment depicted in FIG. 5 vary in length longitudinally of the respective manifold or transversely of the path of movement of the glass sheet to correspond to the curvature thereof. The tubes 98 of the upper rows are lengthened from the opposite ends of their associated manifold progressively toward the center thereof while the tubes of the lower rows are shortened from the opposite ends of their associated manifold progressively toward the center of the row to accommodate concavely bent glass sheets therebetween. Because of the extreme curvature in the transverse direction of the sheet, it now becomes apparent why the specific sheet illustrated in the drawings is advanced on the conveyor system 11 in the direction of its longitudinal dimension. This permits optimum blasthead design to provide substantially equal spacing between the numerous tubes and the opposite surfaces of the sheet to achieve uniform tempering throughout. Such uniform tempering would not be possible if the sheet were transported in an orientation 90° from that shown in FIG. 5 because of the severe disparity in heights between the transverse marginal edges of the sheet and the center thereof and the attendant non-uniform spacing of the tube outlets therefrom.

To prevent "blow back" of the cooling air from the blastheads 93 and 95 rearwardly into the bending station 15, a slidable gate 100 is located between the bending and the tempering stations 15 and 16. The gate 100 is movable vertically between an open position shown in full lines and a closed position shown in dotted lines in FIG. 1 by means of an actuating cylinder 101 automatically operable to open the gate 100 just prior to the entry of a glass sheet into tempering station 16 and to close gate 100 immediately after the sheet is completely contained therein.

The mode of operation of the apparatus of this invention in bending and tempering one sheet of glass is as follows:

A flat glass sheet S is loaded onto the conveyor rolls 23 at the entrance end (not shown) on the furnace 13 for movement through the heating chamber 22 wherein the sheet is heated uniformly to substantially its softening point or bending temperature. This heated sheet passes through the opening 25 and is transferred onto conveyor rolls 26 for movement into the bending station 15, wherein the sheet is transferred onto conveyor rolls 27 for movement between the male and female mold members 30 and 31.

As the sheet enters the bending station 15 i.e. when the leading edge of the advancing sheet overlies the trailing edge or the shorter end bar 63 of female press member 31, a photoelectric cell or other suitable detection device (not shown) actuates a control valve for increasing the pressure of the combustion gases delivered to the burners 70 from the lower pressure "pilot" setting to a high pressure setting. Since it is desirable to maintain the lower roll contacting surface of the sheet as cool as possible to minimize roll marking and distortion, preferably only the burners 70 of the male press member 30 are increased to this high pressure setting to direct the heat generated thereby against the upper surface only of the advancing sheet. However, the burners of both press members can be increased to the high pressure setting or, only selective burners in the upper or both press members can be activated, as desired, to heat selective portions of the sheet. Moreover, as hereinbefore mentioned, this high pressure setting can vary with individual burners 70 as determined by manipulation of the hand-operable control valve 77. Thus, supplemental heat is applied to the sheet as it advances between the press members 30 and 31 to assure the minimal temperature necessary for proper tempering without overheating. This high pressure setting is maintained until the advancing sheet is halted by the stops 37, whereupon the high pressure setting is decreased to the lower pressure pilot setting. The stops 37, which are longitudinally offset from each other, are effective to accurately align the sheet S between the opposed press members 30 and 31.

The aforementioned detection device, responsive to the sheet entering the bending station 15, also initiates actuation of a timer (not shown) controlling operation of the bending cycle. The timing of this control is such that when the leading edge of the sheet S engages the stops 37, cylinder 67 is actuated to raise the female press member 31 upwardly to remove the sheet from the conveyor rolls 27 and press the same against the male press member 30 to bend sheet S to the desired shape. During the upstroke of the female press member 31, cylinders 40 are actuated to retract the locator stops 37 to permit advancement of the bent sheet when subsequently returned to the conveyor rolls 27.

After the glass sheet S has been pressed into the desired shape, the female press member is lowered below conveyor rolls 27 to deposit the bent sheet thereon. The specially configured rolls 27 receive the bent sheet and preserve the shape imparted thereto while advancing the same out of the bending station 15 and onto the successive contoured supporting surfaces of conveyor rolls 86. As the bent sheet leaves bending station 15, cylinder 101 becomes operative by a suitable sensing device to retract and open gate 100 permitting entry of the sheet into tempering station 16. The bent sheet is advanced on conveyor rolls 86 between the opposed tubes 98 of blastheads 93 and 95 at a speed promoting a suitable rate of cooling to obtain a quality temper in the sheet.

The preferred process according to this invention has been tested in a continuous production operation for successfully bending glass sheets to the desired curvature and satisfactorily tempering the same to meet particle size requirements when broken. The glass sheets formed by this process were of a generally polygonal shape in plan having a thickness of approximately 0.125 inch, was approximately 30 inches in length along the longest edge thereof and about 29.5 inches in length along the slightly shorter opposite longitudinal edge. The sheet was 14 inches wide along the leading edge at its widest dimension and 3.5 inches wide at the narrow end. In the production run, the glass sheets were bent about a longitudinal line to form a transverse curve having a rise of approximately five-eighths of an inch of the lateral marginal edges with respect to the center portion and the rear end portion was bent about a transverse line to form a swept-up trailing edge projecting about a half inch from the major portion or body of the sheet. The low pressure or pilot setting for each burner was approximately 3 inches of water column and the high pressure setting was adjusted to about 15 inches water column. The high pressure setting began as the leading edge of the advancing sheet, was disposed in vertical registry with the trailing or narrow end of the female press member 31 and was interrupted when the leading edge engaged stops 37.

In the blasthead, the bent sheets were rapidly chilled, using air at pressures of approximately 25 inches of water column against the top surfaces and 40 inches against the bottom surfaces. The reason for the relatively greater bottom pressures, which is the opposite of conventional air tempering practices, was to aid in developing and freezing the cooler bottom "skin" of the sheet. Moreover, the relatively higher bottom pressures prevented the swept-up tail end from curling downwardly out of the desired shape and tended to enhance optical quality. The lesser top pressures prevented the bent sheets from being pressed against the conveyor rolls, thus minimizing roll distortion. However, the sheets were not "floating" on the rolls because the higher bottom pressure was somewhat balanced by the greater volume of air from the upper blasthead, which was designed to carry more tubes than the lower blasthead.

The above process has proven satisfactory in maintaining the bent glass sheets sufficiently heated throughout to obtain a quality temper therein. A greatly improved survival rate through the tempering section was realized as compared to the survival rate of similarly shaped glass sheets having comparable dimensions processed in the conventional manner without benefit of reheating.

From the foregoing, it is apparent that the objects of the invention have been fully accomplished. An improved method and apparatus is provided for bending and tempering relatively thin glass sheets having compound bends by reheating or applying supplemental heat to the sheets immediately prior to bending to make up heat losses occurring after initial heating and thereby maintain the temperature of the glass within acceptable limits for quality tempering. By the provision of specially configured conveyor rolls in the press and tempering areas, the shape initially imparted to the sheet during bending is preserved throughout. The employment of relatively greater air tempering pressures against the sheet bottom surfaces than the top surfaces also aided in preserving the shape of the bent sheets while enhancing optical quality.

It is to be understood that the form of the invention herewith shown and described is to be taken as an illustrative embodiment of the same and that various changes in the shape, size and arrangement of parts, as well as various procedural changes, may be resorted to without departing from the spirit of the invention.

We claim:

1. Apparatus for bending and heat treating relatively thin glass sheets comprising: means including a furnace for heating a flat sheet of glass to substantially the softening point thereof, means including spaced conveyor rolls for supporting and conveying said heated sheet in a horizontal plane and moving the same in a generally horizontal path from said furnace toward and between opposed lower and upper horizontally disposed press members located exteriorly of said furnace and having complemental shaping surfaces, said lower press member having a shaping rail constituting the shaping surface thereof and formed of a plurality of spaced apart segments permitting passage of said shaping rail past said conveyor rolls upon vertical movement relative thereto, a plurality of heating elements detachably mounted on said lower press member for applying supplemental heat to said sheet while the latter is being advanced horizontally between said press members whereby the sheet is substantially continuously heated while conveyed from said furnace to a desired bending position between said press members, means on said lower press member interrupting advancement of said sheet in a desired position between said press members, and means for moving said lower press member toward the other for lifting said sheet from said conveyor rolls and pressing said sheet into shape between said complemental shaping surfaces, said heating elements movable along with said lower press member to maintain a constant spacing between said heating elements and said sheet upon vertical movement of said lower press member, said heating elements being arranged in spaced rows extending generally parallel to the axes of said conveyor rolls and offset therefrom to provide clearance for said rolls upon vertical movement of said lower press member.

2. Apparatus according to claim 1, wherein said conveying means comprises a plurality of rotatable conveyor rolls of uniform diameters throughout mounted between said press members and having arcuately shaped central portions conjointly defining a supporting surface complementary to the curvature of the glass sheet after the bending thereof to receive the same and retain said curvature therein, the lateral extent of said supporting surface being slightly shorter than the width of said sheet at its widest lateral dimension.

3. Apparatus according to claim 1, including means for rapidly cooling and tempering said sheets during movement thereof in said horizontal path, said cooling means comprising an upper blasthead for directing cooling fluid at a given pressure against the upper surface of said sheet and a lower blasthead for directing cooling fluid at a pressure greater than said given pressure against the bottom surface of said sheet.

4. Apparatus according to claim 1, wherein said supplemental heating elements comprises a plurality of gas fired burners operable to generate heat between a low and high intensity setting.

5. Apparatus according to claim 4, including a control valve for each burner to vary the heat intensity generated by said burner between said low and high intensity settings.

6. Apparatus according to claim 1, including means for adjusting said heating elements vertically on the lower press member to vary the spacing between said heating elements and said glass sheet when supported on said shaping rail.

* * * * *